Sept. 5, 1950     A. J. SYNCK ET AL     2,521,492
BEARING CONSTRUCTION FOR HAY HANDLING DEVICES
Filed March 24, 1945
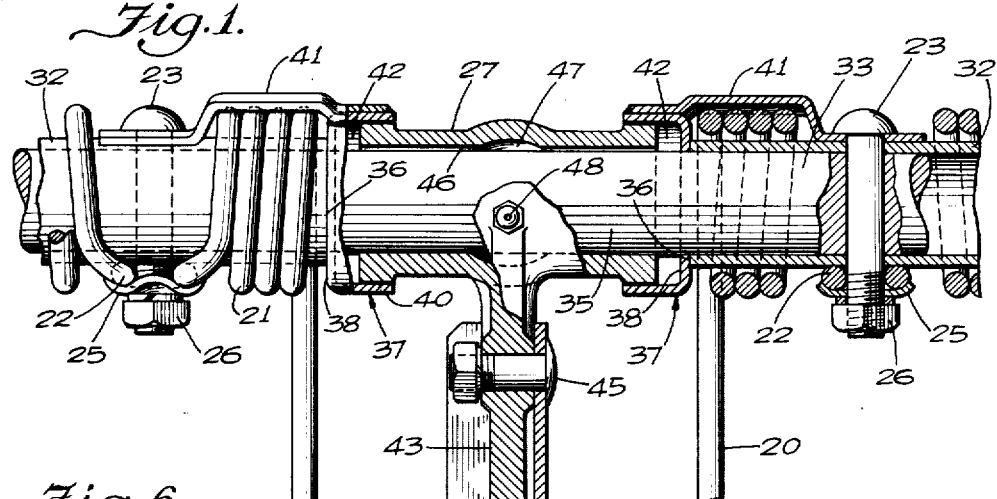
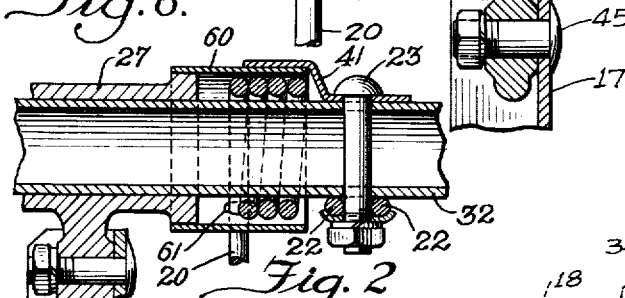
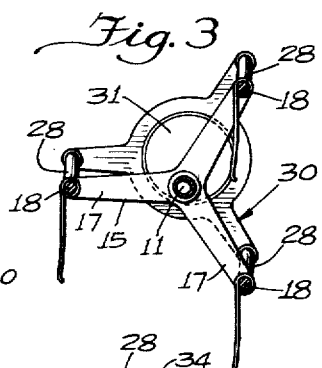
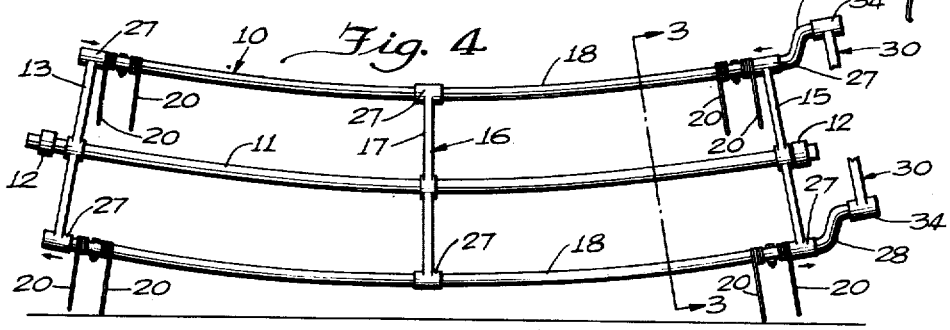
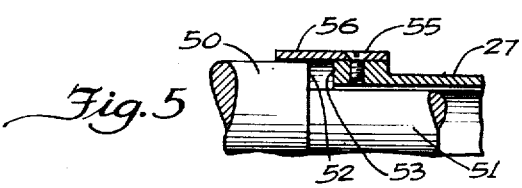
INVENTOR.
Adolph J. Synck
and Wilhelm Vutz
By Mann and Brown
Att'ys.

Patented Sept. 5, 1950

2,521,492

UNITED STATES PATENT OFFICE 2,521,492

BEARING CONSTRUCTION FOR HAY HANDLING DEVICES

Adolph J. Synck and Wilhelm Vutz, Coldwater, Ohio, assignors, by mesne assignments, to Avco Manufacturing Corporation, a corporation of Delaware Application March 24, 1945, Serial No. 584,520

12 Claims. (Cl. 308—36.1)

Our invention relates to bearings in agricultural implements for handling hay and the like and is directed to improvements for meeting certain difficulties peculiar to such implements. The invention is being initially embodied in a combined rake and tedder mechanism and will be so described for the present purpose of disclosure.

In a rake mechanism of the character here under consideration, a bearing construction for a shaft or rotary member is required that will support the shaft both for rotation and for minor longitudinal reciprocation. A number of problems arise in designing a satisfactory bearing for this service that will permit two degrees of relative movement on the part of the journalled shaft.

One problem is found in the tendency of the hay to wrap around the shaft and to crowd into or against the bearing to create such pressures as to overheat the bearing. This problem is aggravated by the reciprocation of the shaft since the reciprocation periodically crowds the wrapped hay against the bearing and since the reciprocation causes clearance spaces in a conventional bearing to expand periodically to receive hay strands and periodically contract to compress the strands.

A second problem is to provide a bearing construction that will keep foreign matter, such as dust and dirt, out of the bearing lubrication. Here again reciprocation of the shaft is a source of trouble, since, in the usual bearing construction, the reciprocation repeatedly exposes lubricant-coated areas of the shaft to catch foreign particles and repeatedly retracts the coated areas to carry the foreign matter into the bearing.

A third problem is to provide for adequate and enduring lubrication. Lubricant that is exposed repeatedly by a reciprocating shaft tends to harden and cake. The reciprocating action, moreover, tends to dry out the bearing by discharging the lubricant longitudinally in both directions from the bearing.

The broad object of our invention is to meet these various problems in a bearing construction. In general, this object is attained by providing at the ends of the bearing shield means having the several functions of preventing wrapping action, of shielding the bearing against the ingress of foreign particles, of preventing undue exposure of the bearing lubricant, and of providing lubricant chambers that expand and contract for pumping lubricant into the bearing in compensation for the inherent tendency of lubricant to work out of the bearing.

The above and other objects and advantages of our invention will be apparent from the following detailed description taken with the accompanying drawings.

In the drawings, which are to be regarded as merely illustrative;

Figure 1 is a fragmentary view partly in side elevation and partly in section showing a preferred embodiment of my invention, Figure 2 is a diagrammatic view to illustrate how a crank action by an inclined shaft causes reciprocation in a bearing, Figure 3 is a view of a crank-controlling mechanism taken as indicated by the section line 3—3 of Figure 4, Figure 4 is a diagrammatic view in side elevation indicating in a grossly exaggerated manner how a raking reel sags under its own weight, Figure 5 is a fragmentary sectional view illustrating a modified form of the invention, and Figure 6 is a similar view of another modified form of the invention.

The bearing chosen to exemplify the features of our invention is employed to rotatably support the raking bars comprising part of a raking reel, such as disclosed in the Oppenheim et al. Patent No. 2,175,088, issued October 3, 1939 and entitled "Combined Side Delivery Rake and Tedder." The construction of the particular parts of such an implement that are pertinent to the present invention may be understood by referring to Figures 3 and 4.

A raking reel generally designated 10 includes a central shaft or axle 11 and is supported in the implement by suitable bearings 12 at the two ends of the central shaft. Fixedly mounted on the central shaft 11 are two end spiders 13 and 15 and an intermediate spider 16. Each of the three spiders has three arms 17. Rotatably mounted on the ends of the arms 17 are three reel raking bars or raking shafts 18, each of which carries a plurality of downwardly extending tines or raking teeth 20. The raking shafts 18 are equipped with such teeth 20 throughout their lengths, but, for the sake of simplicity, Figure 4 shows such teeth only near the ends of the raking bars.

The raking teeth 20 may be provided in pairs by forming suitable lengths of wire 21 in the manner indicated in Figures 1 and 4. Each wire 21 is coiled around the raking shaft 18 to lend resiliency to the downwardly extending ends and is formed centrally into a loop 22 for attachment to the raking shaft by a bolt 23. The bolt 23 carries a special washer or retaining clip 25 under pressure from a nut 26.

For the purpose of rotatably supporting the raking shafts 18, suitable bearings 27 constructed in accord with the present invention are provided at the ends of the respective arms 17 of the three spiders 13, 15 and 16. Figure 1 shows in detail the construction of one of the bearings 27 on the intermediate spider 16 for centrally supporting one of the raking shafts 18.

To keep the raking teeth 20 continuously oriented downwardly as the raking reel 10 rotates about the axis of the central shaft 11, the three raking shafts 18 are each formed or provided with end cranks 28 and the cranks are rotatably engaged by a control spider 30 (Figure 3) journalled on a suitable eccentric 31. The control spider 30 is rotated around the eccentric 31 by the cranks 28 and in turn functions to keep the cranks in substantially fixed orientation, the cranks rotating relative to the reel 10 in reverse directions to compensate for the rotation of the reel as a whole.

The sagging of the raking reel 10 under its own weight, indicated in a grossly exaggerated manner in Figure 4, causes reciprocation on the part of each of the raking shafts 18. The raking reel has the appearance of a truss but the parts of the reel do not cooperate in the manner of a unitary frame, since the raking shafts 18 are slidably mounted in the bearings 27. All of the weight is carried by the central shaft or axle 11 and appreciable bowing is inevitable. As a result of the bowing action the corresponding arms 17 of the two end spiders 13 and 15 are alternately inclined toward and away from each other in the course of each rotation by the reel 10. The distance between the bearings 27 at the two ends of the raking shafts, therefore, alternately increases and decreases. It is apparent that such continual variation in the spacing of the bearings 27 involves relative longitudinal movement between the bearings and the raking shafts 18.

It has been ascertained that the relative longitudinal movement between one of the bearings and the raking shaft journalled therein attributable to the sagging of the raking reel may be as much as $\frac{1}{16}$ of an inch and the relative longitudinal movement caused by the described crank action may amount to ⅛ of an inch.

Our claims appended hereto in reciting reciprocation of a shaft relative to a supporting bar are intended to cover longitudinal movement of the bearing per se relative to the shaft as well as longitudinal movement of the shaft relative to the bearing.

Another cause for relative reciprocation of parts at a bearing in the present apparatus arises from the fact that each of the raking shafts is inclined approximately three degrees out of parallel relation with the central axle 11, the inclination being in a substantially tangential plane. This degree of inclination is shown in a greatly exaggerated manner in Figure 2. At the solid line position of the shaft 18 in Figure 2, the crank 28 is turned inwardly towards the axle 11 and after 180 degrees of rotation the crank is turned outwardly as indicated in broken lines. At their two different positions of the cranks, the crank ends lie in two different planes perpendicular to the axle 11. If the control spider 30 is not free for movement between these two planes, corresponding freedom for such movement must be permitted in the bearings 34 carried by the control spider 30 to journal the crank ends of the cranks 28.

In the construction shown in detail in Figure 1, the raking shaft 18 includes pipes or tubes 32 telescoped over the opposite ends of a solid stub shaft 33, thereby forming a journal 35 of reduced diameter with two inwardly facing annular shaft shoulders 36 at each end of the journal. Backed against each of the annular shaft shoulders 36 is a cup-shaped shield 37 having a radial wall or apertured bottom 38 and a cylindrical wall or portion 40. To hold each of the shields 37 in position, suitable means such as a metal strap 41 may be provided, the metal strap being welded to the shield at one end and being suitably engaged at the other end by one of the bolts 23.

As clearly shown in Figure 1, the spacing between the radial walls 38 of the two shields 37 is substantially greater than the length of the bearing 27, the difference being at least as great as the range of longitudinal reciprocation of the shaft relative to the bearing. The cylindrical wall 40 of each of the shields 37 is telescoped over the corresponding end of the bearing 27 with a running fit so that each of the shields defines with the bearing and the raking shaft 18 a lubricant chamber 42. The longitudinal reciprocation of the raking shaft relative to the bearing 27 will cause the two lubricant chambers 42 to expand and contract alternately, the combined volume of the two lubricant chambers remaining constant.

The bearing 27 may in the form of a casting having a radial arm 43 for attachment to the spider arm 17 by suitable bolts 45. It is contemplated that free communication will be provided between the two lubricant chambers 42 and such communication may be provided by the normal clearance between the bearing 27 and the shaft journal 35. If desired, however, such communication may be insured by forming a longitudinal groove 46 inside the bearing to provide a straight channel between the two lubricant chambers 42. In our preferred construction, the central portion of the bearing 27 is enlarged to form an intermediate annular lubricant chamber 47, which chamber has a lubrication port equipped with a conventional normally closed lubricant fitting 48.

The manner in which the described bearing construction serves its purpose may be readily understood from the foregoing description. The two cup-shaped shields 37 completely enclose the ends of the bearing and make inaccessible to the hay the continually expanding and contracting spaces at the ends of the bearing. In the course of the relative movement of the described parts, there is no outward exposure of surfaces coated with lubricant.

When the bearing is first filled with lubricant through the fitting 48, the lubricant will seep at the crevices formed by the two cup-shaped shields but the seepage will be only minor, the exposed lubricant becoming highly viscous to serve as a seal both against the escape of additional lubricant and against the entrance of foreign particles.

The alternate expansion and contraction of the end chambers 42 may under some conditions serve to repeatedly pump the enclosed lubricant, the lubricant being repeatedly forced inwardly at each end of the bearing and tending to flow from end to end alternately. As a result of such pumping action continuous distribution of the lubricant will occur, all the friction surfaces being continually supplied. In any event the bearing rides back and forth on a cylindrical sheath of lubricant, regardless of whether or not a pumping action is taking place.

The bearings 34 by means of which the control spider 30 operatively engages the cranks 28 may be constructed in accord with the principles revealed in the above description of a bearing 27.

In the modification of the invention indicated by Figure 5, a solid raking shaft 50 is reduced in diameter to form a journal 51 and an annular shaft shoulder 52. A bearing 27, heretofore described, is mounted on the journal 51 and has a cylindrical end to form an annular shoulder 53 around the journal. Mounted on the end of the bearing 27 by suitable screws 55 is a shield in the form of a cylinder 56 dimensioned to span the space between the two shoulders 52 and 53 and to form a close running fit with the raking shaft at the shoulder 52. It is apparent that this second form of the invention will perform all of the functions of the first described form.

Figure 6 shows another modification of my invention in which a shield in the form of a simple cylinder 60 is mounted on a pipe 32 by means of the usual metal strap 41 and bolt 23. As heretofore described, the bolt also engages the loop portion 22 common to a pair of the raking teeth 20. The cylindrical shield 60 encloses the loop portion of the raking tooth 20 and has a suitable aperture 61 through which the raking tooth extends. While the cylindrical shield 60 is open at one end and therefore does not provide the pumping action heretofore described, it does serve adequately to prevent the raked material from wrapping around the pipe 32 at the end of the bearing 27.

The described forms of the invention will suggest to those skilled in the art various other changes and substitutions within the scope of our appended claims.

We claim:

1. In an agricultural device of the character described for handling hay and the like, a shaft exposed to the hay and operating with both relative rotation and minor relative longitudinal reciprocation, said shaft including two tubular members telescoped over the opposite ends of an intermediate member to provide a journal with circumferential shoulders at the opposite ends thereof, a bearing embracing said journal, said bearing having cylindrical ends and being shorter than said journal by at least the extent of said minor reciprocation, and two anti-wrap shields fixedly carried by said shaft at the two ends respectively of said bearing, said shields having cylindrical portions extending from the annular shoulders of the shaft and fitting closely in slidable relation over the ends of the bearing to define with the bearing and shaft two annular lubricant chambers at the opposite ends of the bearing, said chambers having a constant combined volume but individually expanding and contracting in response to the minor reciprocations of said shaft, said bearing defining with said shaft an intermediate annular lubricant chamber with a normally closed lubrication port, said intermediate chamber being in communication with the two end chambers whereby lubricant is repeatedly pumped from one end of the bearing towards the other as the shaft reciprocates.

2. In an agricultural device of the character described for handling hay and the like, a shaft exposed to the hay and operating with both relative rotation and minor relative longitudinal reciprocation, said shaft including two tubular members telescoped over the opposite ends of an intermediate member to provide a journal with circumferential shoulders at the opposite ends thereof, a bearing embracing said journal, said bearing having cylindrical ends and being shorter than said journal by at least the extent of said minor reciprocation, and two anti-wrap shields fixedly carried by said shaft at the two ends respectively of said bearing, said shields having cylindrical portions extending from the annular shoulders of the shaft and fitting closely in slidable relation over the ends of the bearing to define with the bearing and shaft two annular lubricant chambers at the opposite ends of the bearing, said chambers having a constant combined volume but individually expanding and contracting in response to the minor reciprocations of said shaft, said bearing providing a passage interconnecting said lubricant chambers whereby a lubricant is repeatedly pumped from one end of the bearing towards the other.

3. In an agricultural device of the character described for handling hay and the like, a shaft exposed to hay and operating with both relative rotation and minor relative longitudinal reciprocation, said shaft having a portion reduced in diameter to form a journal with circumferential shoulders at each end thereof, a sleeve type bearing embracing said journal, said bearing having cylindrical ends and being shorter than said journal by at least the extent of said minor reciprocation, and two anti-wrap shields fixedly carried by said shaft at the two ends respectively of said bearing, said shields having cylindrical portions extending from the annular shoulders of the shaft and fitting closely in slidable relation over the ends of the bearing to define with the bearing and shaft two annular lubricant chambers at the opposite ends of the bearing, said chambers having a constant combined volume but individually expanding and contracting in response to the minor reciprocations of said shaft, said bearing providing communication between said lubricant chambers whereby lubricant is repeatedly pumped from one end of the bearing towards the other.

4. In an agricultural device of the character described for handling hay and the like, a shaft exposed to the hay, said shaft operating with both rotation and longitudinal reciprocation, two spaced annular shoulders on said shaft facing towards each other, a bearing embracing said shaft between said shaft shoulders, said bearing being shorter than the spacing between the shoulders by at least the range of said reciprocation, said bearing being cylindrical at its ends to form two annular bearing shoulders thereby providing at each end of the bearing a pair of shoulders comprising a shaft shoulder and an opposed bearing shoulder, and a cylindrical wall at each end of the bearing spanning the space between said opposed shoulders and slidingly embracing one of the shoulders, said two cylindrical walls, shaft and four shoulders forming two lubricant chambers that alternately expand and contract at the two ends of the bearing in response to longitudinal reciprocation of said shaft.

5. In an agricultural device of the character described for handling hay and the like, a shaft exposed to the material being handled, said shaft operating with both relative rotation and minor longitudinal reciprocation, a bearing rotatably supporting said shaft, said bearing having cylindrical ends, two anti-wrap shields fixedly carried by said shaft at the two ends respectively of said bearing, each of said shields having a cylindrical portion telescoped over the end of the bearing and having a wall extending from said cylindrical portion to the periphery of said shaft, said walls of the two shields being at greater spacing from each other than the length of the bearing whereby the two shields form two annular lubricant chambers at the opposite ends of the bearing, said chambers having a constant combined volume but individually expanding and contracting in response to the minor reciprocations of said shaft, said bearing defining with said shaft an intermediate annular lubricant chamber with a normally closed lubrication port, said intermediate chamber being in communication with said two end chambers whereby lubricant is repeatedly pumped from one end of the bearing to the other as the shaft reciprocates.

6. In an agricultural device of the character described for handling hay and the like, a shaft exposed to the material being handled, said shaft operating with both relative rotation and minor longitudinal reciprocation, a sleeve type bearing rotatably supporting said shaft, said bearing having cylindrical ends, two anti-wrap shields fixedly carried by said shaft at the two ends respectively of said bearing, each of said shields having a cylindrical portion telescoped over the end of the bearing and having a wall extending from said cylindrical portion to the periphery of said shaft, said walls of the two shields being at greater spacing from each other than the length of the bearing whereby the two shields form two annular lubricant chambers at the opposite ends of the bearing, said chambers having a constant combined volume but individually expanding and contracting in response to the minor reciprocations of said shaft, there being free communication between said chambers whereby lubricant is repeatedly pumped from one end of the bearing towards the other.

7. In an agricultural device of the character described for handling hay and the like, a tubular shaft exposed to the hay, a stub shaft member fixedly telescoped into said tubular shaft to serve as a journal therefor, the end of the tubular shaft forming a circumferential shoulder adjacent said journal, a bearing larger in outside diameter than said tubular shaft surrounding said journal portion to support said member for rotation and limited reciprocation, said bearing having a cylindrical end, and a cup-shaped anti-wrap shield apertured to embrace said member in close fit against said shoulder, said shield being telescoped in close clearance fit over the cylindrical end of said bearing to prevent contamination of said bearing by foreign matter without interfering with the rotation and reciprocation of said member.

8. In an agricultural device of the character described for handling hay and the like, a shaft exposed to the hay, said shaft operating with both rotation and longitudinal reciprocation, a bearing embracing said shaft for support therefor, said bearing being of cylindrical configuration to form at its end an annular shoulder around the shaft, a second and oppositely facing annular shoulder on the shaft spaced from said first-mentioned shoulder, and a cylindrical wall spanning the space between said two annular shoulders and slidingly embracing one of the shoulders, said shaft, two annular shoulders and said cylindrical wall forming a lubricant chamber that alternately expands and contracts for pumping action on lubricant therein.

9. A bearing mechanism for an agricultural device adapted to handle hay or the like, including a bearing member, a shaft member having a journal extending through said bearing member, said journal being longer than said bearing whereby said shaft may reciprocate within predetermined limits along the longitudinal axis thereof with respect to said bearing, a pair of annular abutments on one of said members at either end of said bearing member, each of said abutments having an outer face concentric with said axis, and an annular shield for each of said abutments and positioned concentric with said axis, said shields being attached to the other of said members and overlying the outer face of the respective abutment member, each of said shields being of sufficient length to overlap at least a portion of said face of the respective abutment member within said predetermined limits of reciprocation.

10. A bearing mechanism for an agricultural device adapted to handle hay or the like, including a bearing member, a shaft member having a journal extending through said bearing member, said journal being longer than said bearing whereby said shaft may reciprocate within predetermined limits along the longitudinal axis thereof with respect to said bearing, a pair of annular abutments on said bearing member at either end thereof and having an outer face concentric with said axis, and an annular shield for each of said abutments and positioned concentric with said axis, each of said shields being attached to said shaft member and being of sufficient length to overlie at least a portion of said face of the respective abutment within said predetermined limits of reciprocation.

11. A bearing mechanism for an agricultural device adapted to handle hay or the like, including a bearing member, a shaft member having a journal extending through said bearing member, said journal being longer than said bearing whereby said shaft may reciprocate within predetermined limits along the longitudinal axis thereof with respect to said bearing, a pair of annular abutments on one of said members at either end of said bearing member, each of said abutments having an outer face concentric with said axis, and an annular shield for each of said abutments and positioned concentric with said axis, said shields being attached to the other of said members and being in sliding engagement with the other face of the respective abutment member, each of said shields being of sufficient length to overlap at least a portion of the said face of the respective abutment within said predetermined limits of reciprocation and having a portion of the shield in contact with the periphery of said other member thereby forming a substantially tight lubricant chamber at either end of said bearing whereby the bearing lubricant will be pumped in and out of the bearing as said shaft reciprocates with respect to said bearing.

12. In an agricultural device of the character described for handling hay and the like, a rotary member exposed to the hay, said rotary member having a journal portion, a bearing surrounding said journal portion to support said member for rotation and limited axial movement, said bearing having extended ends, a pair of cup shaped anti-wrap shields, each of said anti-wrap shields having a centrally disposed aperture to embrace said rotary member in close fit, said shields being telescoped in close clearance fit over the extended ends of said bearing, and means to prevent movement of said shields axially relative to said rotary member, said shields being spaced apart on said rotary member to permit limited axial movement of said member relative to said bearing.

ADOLPH J. SYNCK.
WILHELM VUTZ.

REFERENCES CITED

The following references are of record in the file of this patent:

UNITED STATES PATENTS

| Number | Name | Date |
|---|---|---|
| 689,522 | Titus | Dec. 24, 1901 |
| 1,407,186 | Brown | Feb. 21, 1922 |
| 1,816,460 | Aller | July 28, 1931 |
| 2,311,279 | Parks | Feb. 16, 1943 |